C. M. MAISEL.
LARDING NEEDLE.
APPLICATION FILED JUNE 15, 1911.
1,086,926.
Patented Feb. 10, 1914.
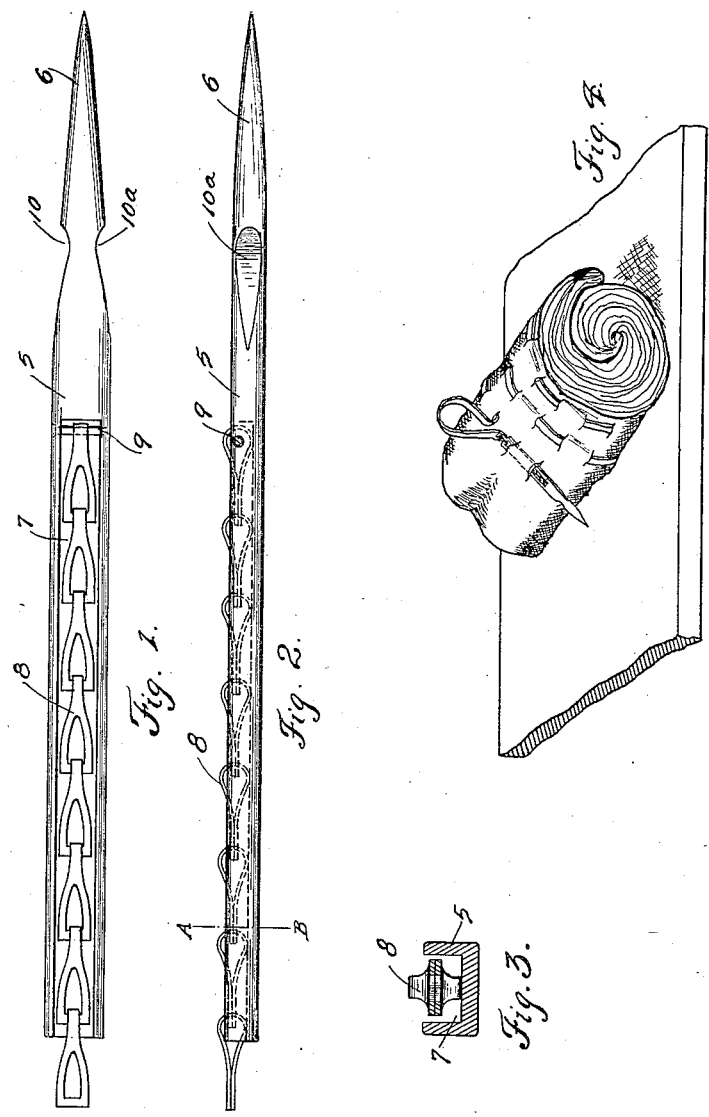
WITNESSES:
INVENTOR
Conrad M. Maisel
BY J. W. M. Ellis
ATTORNEY

UNITED STATES PATENT OFFICE.

CONRAD M. MAISEL, OF BUFFALO, NEW YORK.

LARDING-NEEDLE.

1,086,926.

Specification of Letters Patent.  Patented Feb. 10, 1914.

Application filed June 15, 1911. Serial No. 633,231.

*To all whom it may concern:*

Be it known that I, CONRAD M. MAISEL, a citizen of the United States of America, residing at Buffalo, in the county of Erie and State of New York, have invented certain new and useful Improvements in Larding-Needles, of which the following is a full, clear, and exact description.

One of the objects of my device has been to provide a larding needle which could be operated with great ease and rapidity.

Another object has been to provide a larding needle which will obviate the necessity of cutting the strips of bacon or salt pork in exact lengths, but with which it is possible to thread a continuous strip of bacon or salt pork of any desired length in and out of a roast or other piece of meat, without cutting or tearing the fatty strip or the meat in which it is being inserted.

Reference is to be had to the accompanying drawing, forming part of this specification, in which like characters of reference indicate like parts throughout the several views, of which:

Figure 1 is a plan view of my larding needle. Fig. 2 is a side elevation of the same. Fig. 3 is a sectional view of my invention taken on line A—B of Fig. 2. Fig. 4 is a perspective conventional view of a roast showing several strips of bacon or salt pork already inserted in the roast, and also shows a strip of bacon or salt pork being threaded around the roast and my larding needle in place and threaded.

In the drawings, 5 represents the body of my larding needle, which is made of one piece of material, preferably substantially round and is provided with a pointed end 6. In the rear end of the body 5 is provided a longitudinally extending groove 7, in which is disposed a flexible member, preferably a chain 8. A pin 9 passes through the body 5 of the needle near the inner end of the groove 7 and the chain 8 is suitably secured to this pin. Directly behind the pointed end 6 of the body of the needle are provided indentations 10 and 10ª, by which the needle may be more easily withdrawn from the meat into which it has been forced.

When operating my needle, it is run into the roast for substantially three-quarters of its length and then the entering end of the strip of bacon or salt pork is laid in that portion of the groove 7 which still projects from the meat and beneath the chain 8. The needle is now grasped just behind the pointed end 6 and drawn through the meat. As the rear end of the needle is drawn into the meat, the chain 8 bears down on the entering end of the strip of bacon or salt pork and holds the same firmly in place in the groove 7 until its entering end has been drawn through the meat when it will be released. The strip of bacon or salt pork may now be drawn through the meat by hand until the rear end of the strip is about to enter the meat. Then the needle is again inserted in the roast (see Fig. 4) and the entering end of the same strip of bacon or salt pork is again gripped by the chain, as above described and drawn through the meat as hereinbefore described. This can be done any number of times, depending upon the original length of the strip of bacon or salt pork, and without loss of time or waste of material.

It will be seen that my needle is in one piece, thus making it impossible to mislay or lose any of the parts thereof. It is not necessary to draw my needle past the strip of bacon or salt pork, after the latter is inserted in place, as is the case with many of the present forms of larding needles. The danger of tearing the fatty strip or drawing the same out of place is thereby obviated, and much time which might be lost in this way is saved by the use of my device.

Obviously some modifications of the details herein shown and described may be made without departing from the spirit of my invention and I do not wish to be limited to the exact embodiment herein shown and described.

Having thus described my invention, what I claim is:

1. As a new article of manufacture, a larding needle comprising a one-piece pointed body provided with a longitudinal groove and a flexible member disposed in said groove and suitably secured to said body.

2. As a new article of manufacture, a larding needle comprising a one-piece pointed body provided with a longitudinal groove and a chain disposed in said groove and suitably secured at its inner end to said body.

3. As a new article of manufacture, a larding needle comprising a pointed body provided with a longitudinal groove and a chain disposed in said groove and suitably secured to said body, said chain being substantially longer than the length of said groove.

4. As a new article of manufacture, a larding needle comprising a pointed portion and a body portion, each substantially rounded throughout their length, said body portion being provided with a longitudinal groove and a chain disposed in said groove and suitably secured to said body.

In testimony whereof, I have hereunto set my hand in the presence of two subscribing witnesses.

CONRAD M. MAISEL.

Witnesses:
HENRY STRADTMAN,
J. WM. ELLIS.

Copies of this patent may be obtained for five cents each, by addressing the "Commissioner of Patents, Washington, D. C."